US011920774B2

(12) United States Patent
Rae et al.

(10) Patent No.: US 11,920,774 B2
(45) Date of Patent: Mar. 5, 2024

(54) LED CURING APPARATUS AND COOLING MODULE

(71) Applicant: GEW (EC) Limited, Crawley (GB)

(72) Inventors: Malcolm Rae, Crawley (GB); James Hicks, Crawley (GB); Robert Rae, Crawley (GB)

(73) Assignee: GEW (EC) Limited, Crawley (GB)

( * ) Notice: Subject to any disclaimer, the term of this patent is extended or adjusted under 35 U.S.C. 154(b) by 0 days.

(21) Appl. No.: 18/162,911

(22) Filed: Feb. 1, 2023

(65) Prior Publication Data

US 2023/0243496 A1 Aug. 3, 2023

(30) Foreign Application Priority Data

Feb. 1, 2022 (GB) ..................................... 2201293
Feb. 1, 2022 (GB) ..................................... 2201298
Oct. 20, 2022 (GB) ..................................... 2215540

(51) Int. Cl.
*F21V 29/76* (2015.01)
*B05D 3/06* (2006.01)
(Continued)

(52) U.S. Cl.
CPC ................ *F21V 29/76* (2015.01); *B05D 3/06* (2013.01); *B41J 11/00218* (2021.01); *F21V 29/717* (2015.01)

(58) Field of Classification Search
CPC ............................... F21V 29/717; F21V 29/76
See application file for complete search history.

(56) References Cited

U.S. PATENT DOCUMENTS 7,905,633 B2 3/2011 Horng et al.
9,726,435 B2 8/2017 Dahm
(Continued)

FOREIGN PATENT DOCUMENTS

CA 2742670 A1 12/2012
CN 201007451 Y 1/2008
(Continued)

OTHER PUBLICATIONS

Search Report dated Mar. 8, 2022 issued for GB Application No. 2201298.3.
(Continued)

*Primary Examiner* — Thomas M Sember
(74) *Attorney, Agent, or Firm* — ARENTFOX SCHIFF LLP

(57) ABSTRACT

A cooling module, which is securable to one or more thermal transfer members for an LED curing apparatus, wherein the cooling module comprises a first finned heat sink and a second finned heat sink; wherein the first finned heat sink is removably securable to the second finned heat sink to provide at least one aperture therebetween, wherein each of a plurality of fins protrude from the first finned heat sink and from the second finned heat sink and each fin is substantially perpendicular to the length of the or each aperture, wherein the first finned heat sink is removably secured proximal to the second finned heat sink by at least one locking member, and wherein the or each locking member is inserted such that its length is parallel to the length of the or each aperture.

18 Claims, 12 Drawing Sheets

(51) Int. Cl.
*B41J 11/00* (2006.01)
*F21V 29/71* (2015.01)

(56) References Cited

U.S. PATENT DOCUMENTS

| | | | | |
|---|---|---|---|---|
| 2009/0098342 | A1 | 4/2009 | Chang et al. | |
| 2009/0141494 | A1* | 6/2009 | Zhang | F21V 29/73 362/373 |
| 2009/0308575 | A1 | 12/2009 | Yao | |
| 2010/0060131 | A1 | 3/2010 | Chan et al. | |
| 2010/0321893 | A1 | 12/2010 | Andrews | |
| 2011/0063832 | A1* | 3/2011 | Hu | F21V 29/75 362/373 |
| 2011/0205742 | A1 | 8/2011 | Lee | |
| 2011/0267780 | A1 | 11/2011 | Thrailkill | |
| 2012/0044642 | A1 | 2/2012 | Rodriguez | |
| 2015/0354902 | A1 | 12/2015 | McDonald | |
| 2018/0339507 | A1* | 11/2018 | Rae | B41F 23/0406 |

FOREIGN PATENT DOCUMENTS

| | | | |
|---|---|---|---|
| DE | 102018121707 | A1 | 3/2020 |
| EP | 2525137 | A1 | 11/2012 |
| EP | 3192588 | A | 7/2017 |
| GB | 2563109 | A | 12/2018 |
| IT | RM20110485 | A1 | 3/2013 |
| JP | 2011134938 | A | 7/2011 |
| JP | 2018001646 | A | 1/2018 |
| JP | 2018134815 | A | 8/2018 |
| KR | 20110084776 | A | 7/2011 |
| WO | 2010117174 | A2 | 10/2010 |
| WO | 2014077481 | A1 | 5/2014 |

OTHER PUBLICATIONS

Search Report dated Dec. 19, 2022 issued for GB Application No. 2215540.2.

Search Report dated Mar. 8, 2022 issued for GB Application No. 2201293.4.

Extended European Search Report in EP23154408.1, dated Jun. 27, 2023, 9 pages.

Extended European Search Report in EP23154409.9, dated Jun. 28, 2023, 8 pages.

Extended European Search Report in EP23154406.5, dated Jun. 26, 2023, 13 pages.

* cited by examiner

LED CURING APPARATUS AND COOLING MODULE

CROSS-REFERENCE TO RELATED APPLICATIONS

The present application claims priority to GB Patent Application Serial No. 2201293.4, filed Feb. 1, 2022, GB Patent Application Serial No. 2201298.3, filed Feb. 1, 2022, and GB Patent Application Serial No. 2215540.2, filed Oct. 20, 2022, the contents of each of which are incorporated herein by reference in their entirety.

FIELD

The present invention relates to an improved cooling system for an LED curing apparatus for printing and coating applications and a method of installation of an improved cooling system.

BACKGROUND

The use of LED (light-emitting diode) arrays for curing in printing and coating applications is becoming increasingly popular as an alternative to traditional mercury arc lamps. However, a limitation to the use of LEDs in existing curing apparatus, which have a standard heat sink and known cooling systems to carry heat away from the LEDs, is that the apparatus must be run at a reduced power to prevent overheating of the LEDs.

There is a need to ensure that heat generated is efficiently transferred away from the high density LEDs. The use of LEDs in print curing applications requires high density packing of LEDs on a circuit board, such that a very large amount of heat is generated across a small area. It is important that the LEDs do not overheat and become damaged or fail. Effective cooling is also needed to ensure that the curing effect is not sub-optimal; that the substrate that is cured is not damaged by the excess heat created; and that the efficiency of the LEDs is not reduced by ineffective cooling.

SUMMARY

To increase the radiation output of the LED curing apparatus, it is necessary to increase the number of LEDs. However, for curing applications requiring a linear array having a fixed area, an increase in the number of LEDs requires an increase in LED density and a reduction in LED spacing. These factors increase the amount of heat generated, such that there is a need for efficient, reliable and uniform cooling to ensure the long-term viability of the LEDs.

A currently proposed solution is described in the applicant's prior published European patent publication EP3406446, which discloses a plurality of heat pipes held within a water-cooled holder. However, cooling of this prior art system requires a water inlet and a water outlet channel. Further known devices are air-cooled and have fans integrated into the LED lamphead. However, there are limitations to the cooling effect that can be achieved using such known devices and air-cooled devices can only currently be operated at lower power. Further, existing air-cooled devices are complex, bulky and incompatible with being integrated into known housings for UV LED print curing apparatus. Thus, there remains a significant need to provide an improved cooling system for LED curing apparatus for printing and coating applications. There are also significant environmental benefits in improving the efficiency of the cooling system because this reduces the power that needs to be supplied to cool the lamphead and so the environmental impact of the curing process.

The present invention sets out to provide an improved LED curing apparatus, an improved cooling module for an LED curing apparatus and a method of installation of a cooling module into an LED curing apparatus, which alleviates the problems described above.

In one aspect, the invention provides a cooling module, which is securable to one or more thermal transfer members for an LED curing apparatus, wherein the cooling module comprises:

- a first finned heat sink and a second finned heat sink;
- wherein the first finned heat sink is removably securable to the second finned heat sink to provide at least one aperture therebetween and,
- wherein each of a plurality of fins protrude from the first finned heat sink and from the second finned heat sink and each fin is substantially perpendicular to the length of the or each aperture.

It is understood that "length" refers to the longest dimension of the aperture.

Preferably, the cooling module is an LED curing apparatus cooling module.

Preferably, the or each thermal transfer member is a metal rod.

Preferably, the or each thermal transfer member is a heat pipe.

Optionally, the or each thermal transfer member is a metal rod or a metal pipe. Further optionally, the or each thermal transfer member is a copper rod or a copper pipe.

Preferably, the first finned heat sink and the second heat sink are extruded.

Optionally, the first finned heat sink and the second heat sink comprise a plurality of blades. Further optionally, the first finned heat sink and the second heat sink comprise a plurality of skived fins or blades.

The present invention is a significant improvement because the first and second finned heat sinks maximise heat transfer away from the cooling module.

Preferably, the at least one aperture is substantially cylindrical.

Preferably, the cooling module comprises a row of apertures. More preferably, a row of substantially cylindrical apertures.

Preferably, the cooling module comprises a row of apertures along its midline, wherein an inner surface of the first finned heat sink is proximal to an inner surface of the second finned heat sink substantially along the midline of the cooling module.

It is understood that in the context of this invention "proximal to" means that the first finned heat sink is close to the second finned heat sink.

It is understood that in the context of this invention the "midline" of the cooling module is the line or plane of the body of the cooling module equidistant from the outer finned surfaces of the first and second finned heat sinks. The outer surfaces are furthest from the length of the thermal transfer members/heat pipes in use.

Preferably, the cooling module comprises one or more heat pipes; more preferably, the or each heat pipe is substantially cylindrical.

Preferably, the cooling module comprises one or more thermal transfer members; more preferably, the or each thermal transfer member is substantially cylindrical.

Preferably, the cooling module comprises one or more metal rods; more preferably, the or each metal rod is substantially cylindrical.

Preferably, the or each thermal transfer member is substantially in contact with the wall of the aperture into which it is received.

Preferably, the or each metal rod is substantially in contact with the wall of the aperture into which it is received.

Preferably, the or each heat pipe is substantially in contact with the wall of the aperture into which it is received.

Preferably, the first finned heat sink and the second finned heat sink are secured to the or each thermal transfer member.

Preferably, the first finned heat sink and the second finned heat sink are secured to the or each metal rod.

Preferably, the first finned heat sink and the second finned heat sink are secured to the or each heat pipe.

Preferably, the first finned heat sink is spaced apart from the second finned heat sink by the or each thermal transfer member.

Preferably, the first finned heat sink is spaced apart from the second finned heat sink by the or each metal rod.

Preferably, the first finned heat sink is spaced apart from the second finned heat sink by the or each heat pipe.

Preferably, the first finned heat sink is spaced apart from the second finned heat sink by the or each thermal transfer member along the mid-line of the cooling module.

Preferably, the first finned heat sink is spaced apart from the second finned heat sink by the or each metal rod along the mid-line of the cooling module.

Preferably, the first finned heat sink is spaced apart from the second finned heat sink by the or each heat pipe along the mid-line of the cooling module.

The configuration of the cooling module of the present invention maximises the efficiency of cooling by increasing the heat transfer away from an LED curing system using a thermal transfer member/s, such as a metal rod/s or heat pipes. The finned heat sinks can be closely fitted to the thermal transfer member; for example, so that the cylindrical apertures are each adjacent to the condenser section of a heat pipe/s received in a respective cylindrical aperture. The present invention maximises the efficiency of heat transfer away from the LEDs and then from the thermal transfer member, such as metal rods or heat pipes, by allowing multiple thermal transfer members (metal rods or heat pipes) to be fitted close together and maximising the transfer of heat away from the cooling module by maximising the number of fins and the surface area through which heat can be transferred away.

Preferably, the axis of each cylindrical aperture is positioned equidistant from the outer edge of the first finned heat sink and from the outer edge of the second finned heat sink.

The axis of the or each cylindrical aperture is the segment containing the centre of the two bases of the cylinder.

Preferably, the cooling module is substantially symmetrical about a rotational axis of symmetry positioned along its midline.

It is understood that in the context of this invention, "symmetrical" refers to the shape and configuration of the first finned heat sink being the same as the shape and configuration of the second finned heat sink. That is, in use the first finned heat sink could take the place of the second finned heat sink if it were rotated by 180-degrees.

Preferably, the fins of the first finned heat sink are aligned to be symmetrical with the fins of the second heat sink about the midline of the cooling module.

Preferably, the first and second finned heat sink each comprise an array of fins wherein each fin is equidistant from an adjacent fin.

The symmetry and the uniform arrangement of the fins of both the first and second finned heat sink ensures that there is equal cooling along the length of each finned heat sink and across the width of the cooling module/s. For example, in an air cooled device the velocity of air along the fins and so along the length of the lamphead in which the cooling modules are installed is uniform, such that the cooling effect along the length of the lamphead is uniform. Similarly, the symmetry of the cooling module/s ensures that the velocity of air and the rate of cooling across the width of the lamphead is also uniform. This improves the quality of the cured substrate and minimises the risk of damage to any of the LEDs.

Preferably, the first finned heat sink is removably secured proximal to the second finned heat sink by at least one locking member, wherein the or each locking member brings the first finned heat sink into locking engagement with the second finned heat sink. More preferably, the first finned heat sink is removably secured proximal to the second finned heat sink by at least two locking members, wherein the or each locking member brings the first finned heat sink into locking engagement with the second finned heat sink.

Preferably, the or each locking member is spaced apart from the or each fin of the first finned heat sink and the or each fin of the second finned heat sink.

The arrangement of the present invention allows for the first and second finned heat sink to be coupled together without the or each locking member interfering with the fins that protrude from the first and second finned heat sink. Thus, the locking member does not reduce the capacity for heat transfer away from the thermal transfer members (heat pipes or metal rods) via the finned heat sinks. If the cooling module requires fixings that are not spaced apart from the fin/s of the heat sink then the surface area available for heat transfer away from the cooling module is reduced. The configuration of the locking member does not take up space that is better utilised by a fin/s to maximise cooling. Furthermore, the locking member does not interfere with the uniform arrangement of the fins along the length of the cooling module so that, for an air-cooled device, air flow through the fins is uniform along the length of the cooling module and the lamphead to which it is fitted.

Preferably, the first finned heat sink comprises at least one locking tab for interlocking with at least one locking tab on the second finned heat sink.

More preferably, the first finned heat sink comprises at least two locking tabs for interlocking with at least two locking tabs on the second finned heat sink.

The present invention ensures that the force exerted on the thermal transfer members (heat pipe/s or metal rods) by the first finned heat sink is equal to the force exerted on the thermal transfer members (heat pipe/s or metal rod/s) by the second finned heat sink.

It is understood that "interlocking" refers to component parts that, in use, mechanically connect and fit together so that movement of the connected parts is constrained.

Preferably, the or each locking tab is L-shaped or U shaped.

The arrangement of the present invention allows for the two component parts; i.e., the first and second finned heat sinks, to be conveniently held in place around the thermal transfer member; for example, the heat pipes, before the finned heat sink is locked into position. The two-stage securing process allows for location and adjustment of the components before they are fixed into position and avoids any risk of damage or misalignment of the heat pipes within the cooling module. The carefully configured interlocking arrangement of the locking tabs is an efficient way to position and secure the finned heat sink without the use of additional tools or fixings.

Preferably, movement of the first finned heat sink away from the second finned heat sink moves the or each locking tab of the second finned heat sink into an interlocking configuration.

Preferably, when the or each locking tab of the first finned heat sink and the or each locking tab of the second finned heat sink are interlocked, further movement of the first finned heat sink away from the second finned heat sink is restricted.

Preferably, when the or each locking tab of the first finned heat sink and the or each locking tab of the second finned heat sink are interlocked, the first finned heat sink is spaced apart from the second finned heat sink.

More preferably, when the or each locking tab of the first finned heat sink and the or each locking tab of the second finned heat sink are interlocked, the first finned heat sink is spaced apart from the second finned heat sink by about 2 mm.

Preferably, the first finned heat sink and the second finned heat sink are secured to the or each thermal transfer member (metal rod or heat pipe) with a gap between each thermal transfer member (metal rod or heat pipe) and the substantially cylindrical aperture into which it is received of less than or equal to about 1 mm.

Preferably, the or each locking member comprises a tension pin or a resilient pin or a spring pin insertable between the at least one locking tab of the first finned heat sink and the at least one locking tab of the second finned heat sink.

Optionally, the or each locking member comprises a screw; preferably, a threaded screw, insertable between the at least one locking tab of the first finned heat sink and the at least one locking tab of the second finned heat sink.

The mechanical action of the locking member of the present invention is to be biased towards opening so that the first finned heat sink and the second finned heat sink are forced together. The locking member ensures that the cooling module is securely held in position around the thermal transfer members (metal rods or heat pipes) irrespective of heat fluctuations, variations in the size of the metal rods/heat pipes, or misalignments.

Preferably, insertion of the or each locking member between the at least one locking tab of the first finned heat sink and the at least one locking tab of the second finned heat sink prevents movement of the first finned heat sink away from the second finned heat sink.

Preferably, insertion of the or each locking member between the at least one locking tab of the first finned heat sink and the at least one locking tab of the second finned heat sink locks the first finned heat sink in position spaced apart from the second finned heat sink.

The locking member of the present invention allows the cooling module to be locked in position without the use of additional tooling or fixings.

Preferably, the or each locking member is inserted such that its length is parallel to the length of the or each aperture.

By using a locking member, such as an elongate locking pin or a screw, locking of the first finned heat sink to the second finned heat sink is achieved without losing any surface area of the fins, which maximises heat transfer away from the cooling modules. Furthermore, the locking member/s do not increase the overall size of the cooling module and so do not increase the size of the lamphead with which the cooling module is used.

Preferably, each locking member is insertable between the at least one locking tab of the first finned heat sink and the at least one locking tab of the second finned heat sink to lock the locking tabs together in a locked configuration.

Preferably, the locking member further comprises at least one stop at a first end.

Preferably, the locking member is tapered at a second end.

Preferably, the locking tabs are immovable in a locked configuration.

Preferably, the first finned heat sink and the second finned heat sink are aluminium. Optionally, the first finned heat sink and the second finned heat sink are copper.

The arrangement of the present invention allows for the cooling modules to be built off-site and conveniently installed on site. The configuration of the first and second finned heat sinks and the locking members allows for easy repair and replacement of the thermal transfer members (metal rods or heat pipes), if required.

In a further aspect the invention provides an LED curing apparatus comprising:

- an LED array comprising a plurality of LEDs mounted on an LED heat sink;
- at least one cooling module as previously described secured around one or more thermal transfer members, wherein the or each thermal transfer member is a metal rod having a first end proximal to the LED array and a second end held substantially within the at least one cooling module.

In a further aspect the invention provides an LED curing apparatus comprising:

- an LED array comprising a plurality of LEDs mounted on an LED heat sink;
- at least one cooling module as previously described secured around one or more thermal transfer members, wherein the or each thermal transfer member is a heat pipe, and the evaporator section of the or each heat pipe is proximal to the LED array and the condenser section of the or each heat pipe is held substantially within the at least one cooling module.

Preferably, the or each thermal transfer member is a heat pipe.

Preferably, the or each thermal transfer member is a metal rod.

Preferably, the LED curing apparatus is for printing and coating applications.

Preferably, the at least one cooling module is locked to the or each metal rod by insertion of at least one locking member; more preferably, the at least one cooling module is locked to the or each metal rod by insertion of at least two locking members.

Preferably, the at least one cooling module is locked to the or each heat pipe by insertion of at least one locking member; more preferably, the at least one cooling module is locked to the or each heat pipe by insertion of at least two locking members.

The use of at least two locking members has been found to be advantageous in preventing any twisting of the first and second finned heat sinks within the cooling module.

Preferably, wherein the or each locking member is inserted into the surface of the or each cooling module that is furthest from the LED array.

Preferably, the LED curing apparatus is air cooled and comprises at least one inlet through which cool air enters the LED curing apparatus and at least one outlet through which heated air leaves the LED curing apparatus.

The thermal transfer member (metal rod or heat pipe) arrangement within the improved cooling module of the present invention is highly effective at removing heat from the densely packed LED array to each finned heat sink.

The cooling modules of the present invention offer a significant improvement in heat transfer away from the LEDs. This significantly reduces the maintenance requirements and environmental damage of unnecessary replacement of the LEDs, whilst also ensuring that the “down time” of the apparatus in the event of failure of the LEDs is significantly reduced.

Preferably, the LED curing apparatus comprises a plurality of cooling modules along the length of the LED curing apparatus.

The “length” is understood to refer to the greatest of the three dimensions of the LED curing apparatus.

The orientation of the apertures of the present invention ensures that the thermal transfer members (metal rods or heat pipes) are positioned to maximise heat transfer away from the heat sink and the LED array. If heat pipes are used, the evaporator section of the heat pipe is closest to the hottest part of the apparatus (LED array). The condenser section of the heat pipe is furthest from the LED array. This heat pipe arrangement ensures that heat is rapidly transferred away from the LEDs and from one end of the heat pipe to the other.

The present invention ensures that a large amount of heat is conducted quickly and efficiently away from each of the one or more LED modules in the LED array. The solution provided by the present invention allows the LED curing apparatus to operate at full power, if required, because the conduction of heat away from the LEDs is much improved. The use of thermal transfer members—i.e. metal rods or heat pipe technology in addition to the improved cooling modules ensures that the heat transfer away from the LEDs is maximised with only a low fluid/air flow requirement. The present invention quickly and efficiently removes the significant amount of heat generated by the LED modules. It is also possible to achieve uniformity of cooling along the length and across the width of the lamphead/apparatus.

The use of highly efficient thermal transfer members, i.e. using metal rods or heat pipe technology together with the finned, shaped heat sinks of the cooling modules allows for an optimal curing effect to be achieved, whilst the LEDs forming the LED array can be operated at a full range of power levels. By ensuring that the risk of overheating is minimised, if not eliminated, the LEDs last longer before it is necessary to replace them; whilst maintenance requirements are reduced. Thus, the present invention offers significant cost and environmental benefits.

The cooling system of the present invention is well-suited to cooling of LED modules, which are a linear source of radiation used for print curing. The arrangement of the metal rods/heat pipes and the cooling modules are carefully configured to be compatible with the small volume available in the housing of the LED curing apparatus and the inclusion of the cooling modules does not interfere with the substrate-facing (outer face) of the LED modules.

In a further aspect, the present invention provides a method of installation of at least one cooling module into an LED curing apparatus, comprising a plurality of thermal transfer members:

removably securing a first finned heat sink to a second finned heat sink to provide at least one aperture therebetween, wherein a thermal transfer member is held within each of the at least one apertures;

adjusting the position of the or each thermal transfer member;

locking the first finned heat sink to the second finned heat sink by insertion of at least one locking member to form a cooling module;

attaching the cooling module to an LED heat sink supporting an LED array.

Preferably, the or each thermal transfer member is a heat pipe.

Preferably, the or each thermal transfer member is a metal rod.

Preferably, the at least one cooling module is a cooling module as described herein.

Preferably, the or each locking member is an elongate locking member; more preferably, the or each locking member is an elongate pin that is inserted such that its length is parallel to the length of the or each aperture.

Optionally, the or each locking member is a screw, preferably a threaded screw, that is inserted such that its length is parallel to the length of the or each aperture Preferably, the method of installation further comprises applying a thermal transfer material to the at least one aperture.

More preferably, the thermal transfer material is a thermal transfer paste.

In a further aspect, the present invention provides a cooling system for an LED curing apparatus comprising at least one LED mount for mounting a plurality of LEDs; at least one bore in the LED mount;

at least one thermal transfer member wherein the or each thermal transfer member is removably connected to a bore; and wherein each thermal transfer member comprises a collar having an outer surface to mate with an inner surface of a bore.

Preferably, the or each thermal transfer member is a metal rod.

Preferably, the collar is attached to a first end of the metal rod.

Preferably, the collar and the metal rod and formed as a single piece.

Optionally, the present invention provides a cooling system for an LED curing apparatus comprising at least one LED mount for mounting a plurality of LEDs; at least one bore in the LED mount;

at least one heat pipe comprising an evaporator section and a condenser section, wherein the or each heat pipe is removably connected to a bore; and wherein each heat pipe comprises a collar having an outer surface to mate with an inner surface of a bore.

Preferably, the collar is attached to the evaporator section of the heat pipe.

Preferably, the outer surface of the or each collar is shaped to mate with a shaped inner surface of a respective bore.

Preferably, the outer surface of the or each collar comprises a threaded portion to mate with a threaded inner surface of a respective bore.

Preferably, the threaded portion is a substantial part of the or each collar.

Preferably, the or each collar is a connecting band; more preferably, an annular band.

Optionally, the or each collar is cylindrical having a base at a first end and an opening at an opposing second end.

Preferably, the or each thermal transfer member is soldered to a collar.

Preferably, the or each heat pipe is soldered to a collar.

Preferably, the or each metal rod is soldered to a collar.

Preferably, the LED mount comprises a thermal transfer material between the or each thermal transfer member and the bore.

Preferably, the LED mount comprises a thermal transfer material between the or each metal rod and the bore.

Preferably, the LED mount comprises a thermal transfer material between the or each heat pipe and the bore.

Preferably, the thermal transfer material is a high performance thermal interface material. More preferably, the thermal transfer material has a thermal conductivity greater than about 5 W/mK.

Preferably, the thermal transfer material is a ceramic paste.

Preferably, the thermal transfer material is provided between the collar and the bore to which the collar is removably connected.

Preferably, the cooling system comprises one or more LEDs mounted on the LED mount.

Preferably, the or each thermal transfer member is positioned adjacent to the LEDs.

Preferably, the or each metal rod is positioned adjacent to the LEDs.

Preferably, the or each heat pipe is positioned adjacent to the LEDs.

Preferably, the LED mount comprises aluminium.

Preferably, the LED mount comprises an aluminium block.

Preferably, the or each collar comprises copper.

Preferably, the or each collar comprises a threaded portion and a non-threaded portion. Preferably, the or each collar comprises a threaded portion and a smooth portion.

Preferably, the or each bore is substantially cylindrical.

In a further aspect, the present invention provides a cooling module comprising the cooling system for an LED print curing apparatus as previously described, wherein the or each thermal transfer member is also connected to at least one air-cooled heat sink.

Preferably, the thermal transfer member is a metal rod.

Preferably, the thermal transfer member is a heat pipe.

Preferably, the cooling module comprises at least one finned heat sink.

According to another aspect of the present invention, there is provided a print curing apparatus comprising a cooling system as described herein.

Preferably, the print curing apparatus is a UV curing apparatus.

In a further aspect, the invention provides an LED curing apparatus comprising:

- at least one LED radiation source mounted on an LED mount;
- a housing comprising at least one air inlet;
- at least one finned heat sink; and
- at least one air passage within the housing from the air inlet through the or each finned heat sink to at least one air outlet;
- wherein the housing comprises a cavity to maintain a higher air pressure proximal to the LED mount than the air pressure within the or each finned heat sink.

Preferably, wherein the housing comprises an inlet cavity below the or each finned heat sink and an outlet cavity above the or each finned heat sink to maintain a higher air pressure below the or each finned heat sink and a lower air pressure above the or each finned heat sink.

More preferably, the LED curing apparatus further comprises a source of air and the air pressure in the inlet cavity below the or each finned heat sink is higher than the air pressure in the outlet cavity above the or each finned heat sink to cause the flow of air along the or each air passage through the housing from the or each inlet to the or each air outlet through the or each finned heat sink.

Preferably, the housing is cuboidal.

Preferably, the at least one air inlet is at a first end of the apparatus.

Preferably, the first end of the apparatus is substantially perpendicular to the base of the apparatus.

Preferably, the at least one air inlet comprises an elongate opening.

Preferably, the at least one air inlet comprises an elongate opening in the upper face of the apparatus.

Preferably, air is pulled out of the housing through the or each air outlet and pulled into the housing through the or each air inlet.

Preferably, the LED curing apparatus comprises a source of air and the air pressure decreases from the at least one air inlet to the inlet cavity and decreases further from the inlet cavity to the outlet cavity and decreases further again from the outlet cavity to the or each air outlet.

Preferably, the housing comprises an upper air channel between the air inlet and the inlet cavity. More preferably, at least part of the upper air channel is substantially parallel to the outer walls of the housing. Preferably, the width of the upper air channel is between about 3 to about 5 mm; more preferably, the width of the upper air channel is about 4 mm.

Preferably, the LED curing apparatus comprises a plurality of LEDs in a linear array.

Preferably, wherein the air passage comprises at least one restriction proximal to the or each finned heat sink.

Preferably, wherein the air passage comprises at least one restriction below the or each finned heat sink.

More preferably, the restriction below the or each finned heat sink reduces the cross sectional area of the air flow path from the inlet cavity below the or each heat sink to the or finned heat sink.

Preferably, the reduction in the cross sectional area of the air flow path from the inlet cavity below the or each finned heat sink to the or each finned heat sink is by a ratio of between 1:2 to 1:3 (inlet cavity:finned heat sink); more preferably, the reduction in the cross sectional area of the air flow path from the cavity below the or each finned heat sink to the or each finned heat sink is by a ratio of 2:5 (inlet cavity:finned heat sink); most preferably, the reduction in the cross sectional area of the air flow path from the cavity below the or each finned heat sink to the or each finned heat sink is by a ratio of 1:2.3 (inlet cavity:finned heat sink).

Preferably, the cross sectional area of the air flow path from the cavity below the or each finned heat sink to the or each finned heat sink reduces by more than 50%.

Preferably, wherein the air passage comprises at least one restriction proximal to the or each finned heat sink and at least one further restriction proximal to the at least one air outlet.

Preferably, the LED curing apparatus further comprises at least one source of cool air and at least one fan to move air into the or each air passage.

Preferably, the LED curing apparatus further comprises at least one source of cool air and at least one fan to blow air into the or each air passage.

Optionally, the LED curing apparatus comprises at least one source of cool air and a plurality of fans.

Preferably, the LED curing apparatus comprises at least one source of a cool air and at least one fan positioned at a distance from the LED curing apparatus; more preferably, the LED curing apparatus further comprises ducting wherein the or each fan is connected to the LED curing apparatus by the ducting.

Preferably, the at least one air inlet is at a first end of the apparatus and the opposing second end of the apparatus is sealed.

Preferably, the or each LED radiation source is arranged at the base of the apparatus.

Preferably, the first end of the apparatus is substantially perpendicular to the base of the apparatus.

Preferably, the or each air outlet is at a first end of the apparatus.

Preferably, the or each air outlet is at a first end of the apparatus and the opposing second end of the apparatus is sealed.

Preferably, the at least one air outlet comprises an elongate opening.

Preferably, the at least one air outlet comprises an outlet in the upper face of the apparatus.

It is understood that in the context of this invention, the "base of the apparatus" is the substrate-facing surface with the or each LED radiation source arranged thereon. The upper face of the apparatus is substantially parallel to and spaced apart from the base of the apparatus.

Preferably, wherein the air pressure at or near the LED mount is greater than air pressure at or near to the finned heat sink.

Preferably, the pressure difference between the inlet cavity and the outlet cavity exceeds between about 150 Pa and 400 Pa along the length of the LED curing apparatus; more preferably, the pressure difference between the inlet cavity and the outlet cavity exceeds between about 150 Pa and 300 Pa along the length of the LED curing apparatus; most preferably, the pressure difference between the inlet cavity and the outlet cavity exceeds about 150 Pa along the length of the LED curing apparatus.

Preferably, the air pressure in the inlet cavity proximal to the or each finned heat sink is between about −310 Pa and −610 Pa relative to atmospheric pressure.

Preferably, the air pressure in the or each outlet cavity is between about

−1150 Pa and −650 Pa relative to atmospheric pressure.

Preferably, the or each finned heat sink comprises at least one air inlet through which air enters from the housing into the finned heat sink.

Preferably, the ambient absolute temperature of air along the length of the LED curing apparatus is substantially uniform.

It is understood that "length" refers to the longest dimension of the LED curing apparatus.

Preferably, the dimensions of the air inlet of the or each finned heat sink restricts the air flow through the inlet.

Preferably, the LED curing apparatus comprises at least one thermal transfer member.

Preferably, the LED curing apparatus comprises at least one heat pipe.

Optionally, the LED curing apparatus comprises at least one metal rod or at least one metal pipe.

Preferably, the LED curing apparatus comprises a plurality of heat pipes.

Preferably, the LED curing apparatus comprises a plurality of metal rods or a plurality of metal pipes.

Within this specification, the term "substantially" is understood to refer to a variation of less than about 20%; preferably, less than about 10%; preferably, less than about 5%; preferably, less than about 2%.

For the purposes of clarity and a concise description, features are described herein as part of the same or separate embodiments; however, it will be appreciated that the scope of the invention may include embodiments having combinations of all or some of the features described.

BRIEF DESCRIPTION OF THE DRAWINGS

The invention will now be described by way of example with reference to the accompanying drawings, in which.

DETAILED DESCRIPTION

Figure 1A:
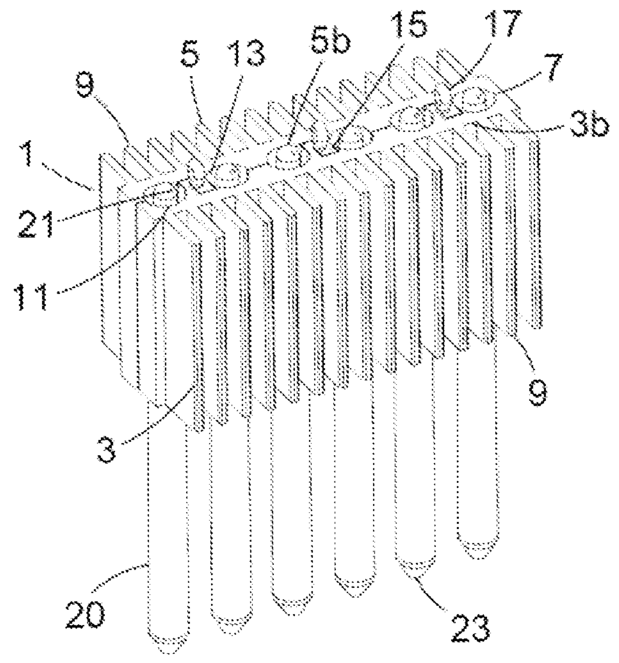
FIG. 1*a* shows a perspective view of a cooling module for an LED print curing apparatus in accordance with the present invention.

Referring to FIG. 1*a*, FIG. 1*b*, FIG. 2 and FIG. 3, a cooling module 1, 1' is shown and comprises a first finned heat sink 3 and a second finned heat sink 5. The first finned heat sink 3 is substantially symmetrical to the second finned heat sink 5 about a central axis 7 or midline where the internal surface 3*a* of the first heat finned sink 3 is proximal to and spaced apart from the internal surface of the second heat finned sink 5. Each finned heat sink 3, 5 is an aluminium extrusion and is shaped to maximise heat transfer away from the heat sink 3, 5 through a plurality of fins 9, which are substantially cuboidal, and each fin protrudes perpendicular to the central axis 7. The plurality of fins 9 are equally spaced from each other so that each fin 9 is spaced from the adjacent fin 9 by a uniform distance. For example, each fin 9 has a width of about between about 1.5 mm and 5 mm and is spaced from the adjacent fin 9. In a preferred embodiment, the fin 9 has a width of about 1.5 mm at its tip with a width increasing towards the midline of the fin with a pitch of 3.5 mm.

Figure 1B:
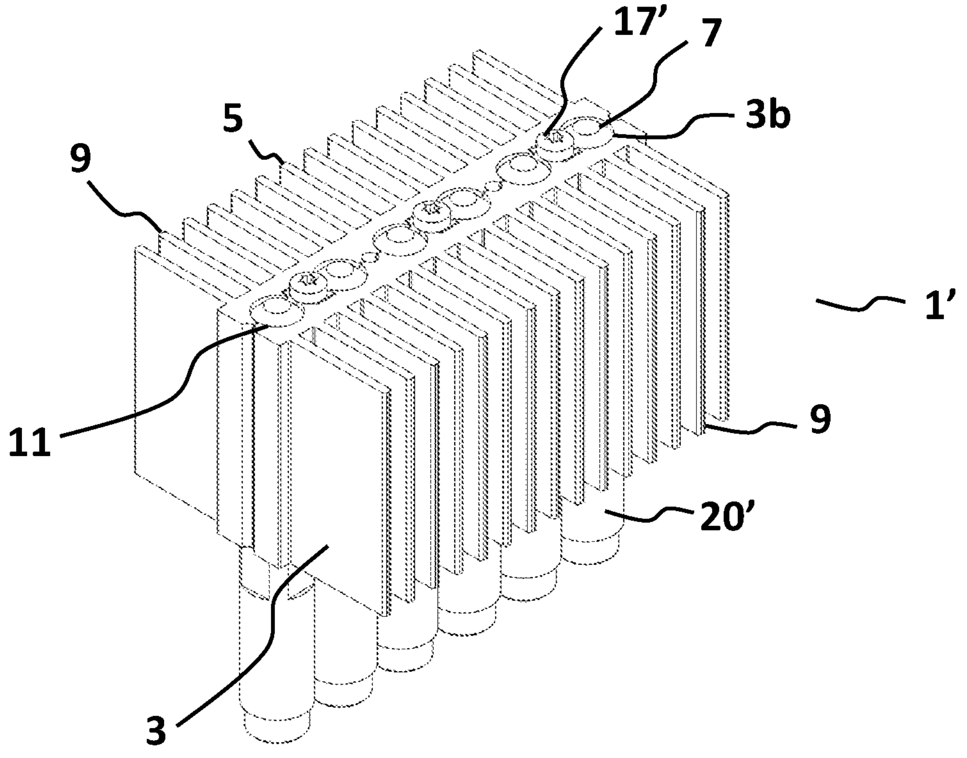
FIG. 1*b* shows a perspective view of an alternative embodiment of the cooling module for an LED print curing apparatus shown in FIG. 1*a*.
Figure 3:
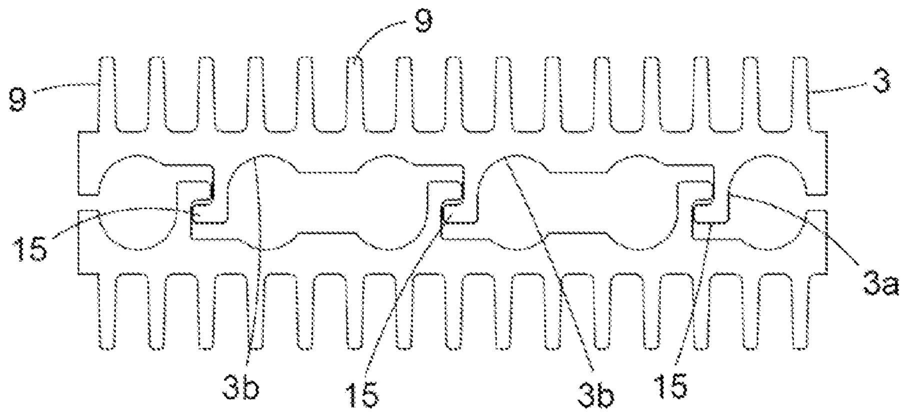
FIG. 3 shows a view from above of a first finned sink in accordance with the present invention.

Referring to FIG. 1*a*, FIG. 1*b* and FIG. 3, the internal surface 3*a* of the first finned heat sink 3 comprises a series of semi-cylindrical recesses 3*b*. The internal surface (not shown) of the second finned heat sink 5 also comprises a series of semi-cylindrical recesses 5*b* and is symmetrical about the central axis 7 where the internal surface 3*a* of the first finned heat sink 3 is proximal to the internal surface 5*a* of the second finned heat sink 5. That is, each of the recesses 3*b*, 5*b* have the shape of a longitudinal half of a cylinder. As shown in FIGS. 1*a* and 1*b*, when the first finned heat sink 3 is removably secured to the second finned heat sink 5 the internal face of the first heat sink 3*a* is spaced apart from the internal face of the second heat sink 5*a* so that a plurality of substantially cylindrical recesses 11 are formed therebetween.

Figure 2:
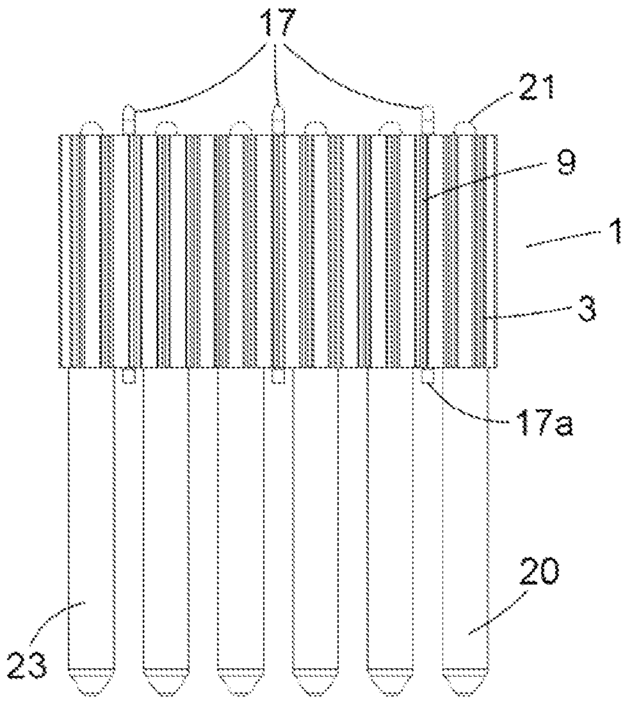
FIG. 2 shows a side view of a cooling module for an LED print curing apparatus in accordance with the present invention.

Referring to FIGS. 1*a*, and 2, in a use configuration, the cooling module 1 is secured to a plurality of thermal transfer members, shown as heat pipes 20.

In alternative embodiments, as shown in FIG. 1*b*, the cooling module is secured to a plurality of thermal transfer members; for example, a metal rod 20' or a metal pipes, such as a copper rod or a copper pipe. The semi-cylindrical recesses 3*b* are substantially the same radius as the outer radius of the metal rod 20'. For example, each metal rod 20' has a radius of about 4 mm and the cylindrical aperture formed by the semi-cylindrical recesses 3*b*, 5*b* have a radius of about 4 mm. This ensures that each metal rod 20' is firmly held in place and that the heat transfer is as efficient as possible from each metal rod 20' to the surrounding finned heat sink 3, 5. This maximises the heat transfer away from each metal rod 20' to the fins 9 of each heat sink 3, 5.

As shown in FIG. 1*a*, a heat pipe 20 is received in each of the cylindrical recesses 11. Each heat pipe 20 is held securely within the cooling module 1 to ensure optimum thermal contact between the condenser section 21 of the heat pipe 20 and the cylindrical recess 11 into which the heat pipe is received. The heat pipes 20 secure the first and second finned heat sinks 3, 5 of the cooling module 1 in a tight clamping arrangement. The semi-cylindrical recesses 3*b*, 5*b* are substantially the same radius as the outer radius of the heat pipe 20. For example, each heat pipe has a radius of about 4 mm and the cylindrical aperture formed by the semi-cylindrical recesses 3*b*, 5*b* have a radius of about 4 mm. This ensures that each heat pipe 20 is firmly held in place and that the heat transfer is as efficient as possible from each heat pipe 20 to the surrounding finned heat sink 3, 5. This maximises the heat transfer away from each heat pipe 20 to the fins 9 of each heat sink 3, 5.

Figure 4B:
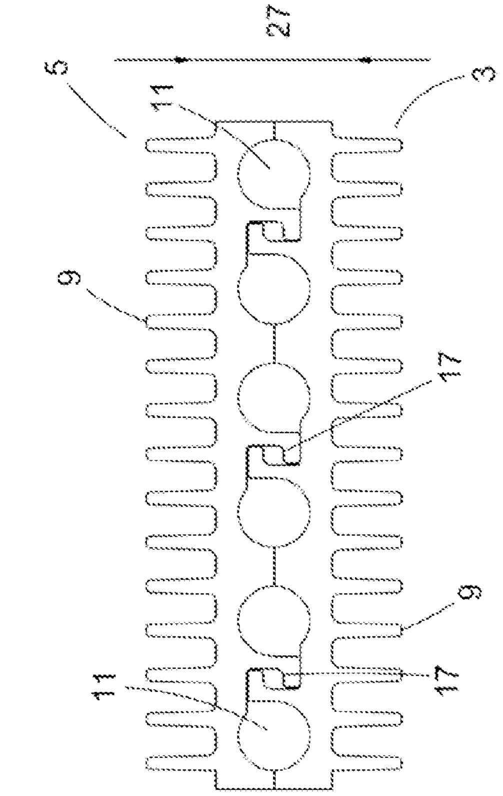
FIG. 4*b* shows a view from above of a first finned heat sink locked to a second finned heat sink (heat pipes not shown) in a use configuration in accordance with the present invention.
Figure 4A:
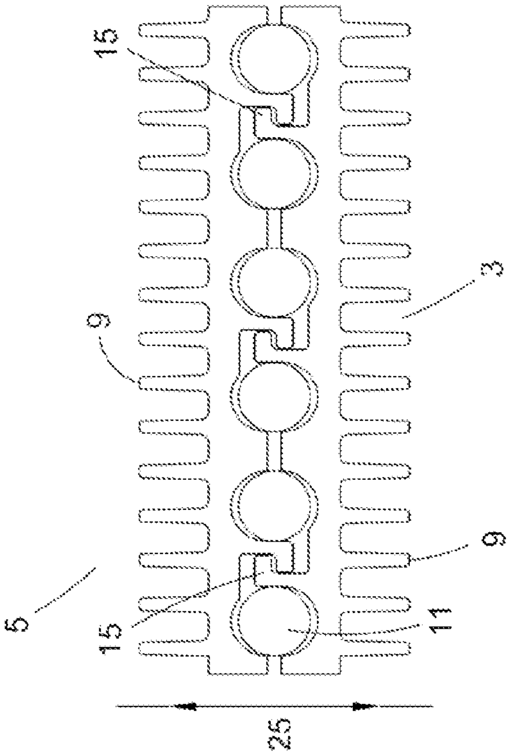
FIG. 4*a* shows a view from above of a first finned heat sink interlocking with a second finned heat sink (heat pipes not shown) in a maintenance or assembly configuration in accordance with the present invention.
Figure 5:
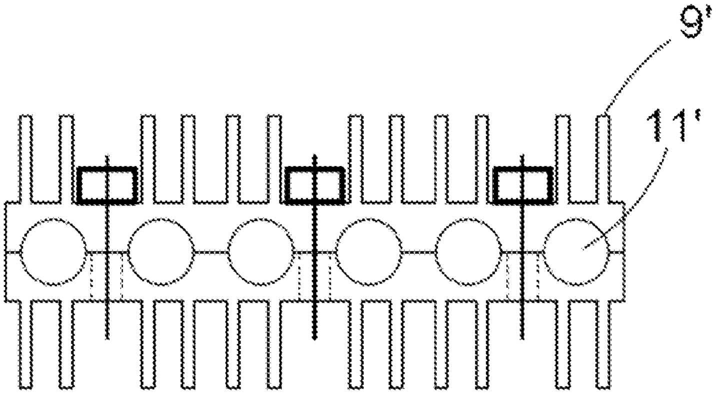
FIG. 5 shows a view from above of a first finned heat sink locked to a second finned heat sink (heat pipes not shown) in a use configuration in an alternative to the present invention.

Referring to FIGS. 3, 4*a* and 4*b*. Each finned heat sink 3, 5 comprises an interlocking tab 15. In the embodiment shown in FIG. 3, the interlocking tab 15 is substantially L-shaped.

Referring to FIG. 4*a*, in a maintenance configuration, each of the plurality of thermal transfer members, such as heat pipes or metal rods (not shown) are located and held within a cylindrical recesses 11 between the first finned heat sink 3 and the second finned heat sink 5. The tab 15 of the first finned heat sink 3 interlocks with the tab 15 of the second heat sink 5 so that the cooling module 1 is held around the thermal transfer members (metal rods or heat pipes) but can be adjusted to allow for ease of insertion of multiple heat pipes into the cooling module. The interlocking tabs 15 stay linked whilst allowing partial movement of the first finned heat sink 3 and the second finned heat sink 5 around the thermal transfer members/heat pipes. In this maintenance configuration there is a small gap between the tab 15 of the first finned heat sink 3 that is interlocked to abut with the tab 15 of the second heat sink 5.

For installation of the cooling module, the thermal transfer members, such as heat pipes 20 or metal rods 20' are first fitted to an LED heat sink on which LEDs are mounted. A carefully measured dose of heat transfer paste is applied to the semi-cylindrical recesses 3*b*, 5*b* of both the first finned heat sink 3 and the second finned heat sink 5. The first finned heat sink 3 and the second finned heat sink 5 are then interlocked as far as the interlocking tabs 15 allow. The interlocked finned heat sinks 3, 5 are then precisely lowered over and around the heat pipes 20. The first finned heat sink 3 is spaced apart from the second finned heat sink 5 when they are brought together to form the cylindrical apertures. The first finned heat sink 3 and the second finned heat sink 5 are mechanically clamped together by the interlocking tabs 15 for ease of installation.

Referring to FIGS. 4*b*, when all of the required thermal transfer members/heat pipes (not shown) are held in the desired position a locking pin 17 is inserted into the or each small gap between the tab 15 of the first finned heat sink 3 that is interlocked with the tab 15 of the second heat sink 5. In this final stage of installation, insertion of the locking pin 17 releases the mechanical clamp between the interlocking tabs 15 to transfer the locking force to the or each locking pin 17. The locking pin 17 is a tension pin or a spring pin. Referring to FIG. 1*b*, in an alternative embodiment a screw 17', for example, a threaded screw, is inserted into the or each small gap between the tab (not shown) of the first finned heat sink 3 that is interlocked with the tab (not shown) of the second finned heat sink 5.

Referring to FIG. 4*b* and FIG. 3, insertion of a locking pin 17 or a screw 17' in a direction parallel to the axis of the cylindrical recess 11 forces the tab 15 of the first finned heat sink 3 into locking engagement with the tab 15 of the second finned heat sink 5. Thus, each heat pipe 20 is held securely with the cylindrical recess 11 in the cooling module 1 so that the condenser section 21 is held against the finned heat sinks 3, 5 for optimum thermal transfer of heat from the heat pipe 20 to the fins 9.

Referring to FIG. 2, the evaporator section of each of the heat pipes 20 protrudes from the base of the cooling module 1 to be secured proximal to the LED heat sink in the lamphead.

Referring to FIGS. 4*a* and 4*b*, in a maintenance position without the locking pin or screw inserted, the first and second finned heat sinks 3, 5 can move in a direction shown by arrow 25 towards and away from a thermal transfer member/heat pipe/s contained between them in the cylindrical recesses. Referring to FIG. 4*b*, when the locking pin 17, or in alternative embodiments a screw, is inserted, in a use position, the first and second finned heat sinks 3, 5 are forced towards each other in a direction shown by arrow 27 so that their internal surfaces are proximal to each other and are locked in position.

In use with an LED curing apparatus, a plurality of cooling modules are arranged along the length of the LED curing apparatus around a plurality of thermal transfer members, for example heat pipes or metal rods. The cooling modules have a length of about 25 mm and are arranged substantially along the full length of the lamphead and are locked in place by the locking pins or screws. For known devices, the thermal transfer members, for example heat pipes or metal rods are spaced at increments of about 2.5 cm for a range of lengths from 2.5 cm to 250 cm. The cooling modules of the present invention are configured so that the cooling modules can be conveniently installed on site; for example, during an on-site repair. The cooling modules can be fixed to the thermal transfer members, for example heat pipes or metal rods, after the LEDs are attached to the LED heat sink.

The lamphead comprises an array of LED modules (not shown), wherein each LED module is a unit containing one or more LEDs. In use, each LED is a radiation source for curing print or a coating on a substrate (not shown). It is understood that the LED modules form a linear radiation source to direct radiation continually onto a substrate during curing. The LED modules comprise boards that rest on a heat sink (not shown). This LED heat sink is adjacent to the evaporator section of each of the plurality of heat pipes or to one end of each of a plurality of metal rods.

In use, the LEDs are arranged to emit radiation from an outer, substrate-facing side through a “curing window” onto a substrate (not shown) to be cured. In alternative embodiments of the present invention, the “curing window” comprises a lens or reflector. The lamphead is an elongate shape and can be fitted directly onto a machine, or is a slideable cuboidal cassette which, in use, is slideable into a housing. When inserted into the housing, the LED modules form a solid radiation emitting face.

Referring to FIGS. 1*a* and 2 in use, heat is transferred away from the inner face of the LED modules to the evaporator section 23 of the heat pipes 20. Heat is carried from the evaporator section 23 of each heat pipe 20 to the condenser section 21 that is held substantially within the cooling module 1. In alternative embodiments, as shown in FIG. 1*b*, heat is carried from a first end of a thermal transfer member, such as a metal rod to a second end of a thermal transfer member/metal rod within the cooling module 1'. Heat is then efficiently transferred though the first and second finned heat sink 3, 5 so that the LEDs are rapidly and efficiently cooled. Furthermore, the configuration of the present invention ensures that the cooling modules 1 hold the thermal transfer members/heat pipes 20', 20 in place, achieving good thermal contact between the finned heat sinks 3, 5 and the thermal transfer members/heat pipes 20', 20, wherein the clamping force between the heat sinks 3, 5 and the thermal transfer members/heat pipes 20', 20 is uniform along the length of the cooling module 1.

The heat pipes 20 of first embodiment of the present invention use known heat pipe technology to take up heat generated by the LED modules (not shown). In use, when the lamphead is switched on and the LEDs are radiating to cure a substrate, heat generated by the LEDs is transferred away from the rear, inner face of each LED module to an aluminium heat sink (not shown). Heat is carried away from the LEDs and the copper heat sink by the heat pipe/s 20 and is then carried away from the heat pipes 20 by the first and second finned heat sinks 3, 5. On heating, the liquid held within the core of the heat pipe 20 is vaporised and the heat is carried away before the liquid re-condenses and a wick transports the liquid back to the base of the heat pipe 20. Heat is rapidly transferred from the LED modules to the heat pipes 20 and to the cooling modules.

Referring to FIG. 1*a* and FIG. 1*b*, to access the thermal transfer members 20, 20' for maintenance or repair, the pins 17 or screws 17' securing the cooling module 1 around the heat pipes 20 or metal rods 20' are removed. With the pins 17 or screws 17' removed, the first finned heat sink 3 is able to move away from the second finned heat sink 5 increasing the size of the cylindrical recesses and allowing the cooling module 1 to be removed from the heat pipes 20 or metal rods 20'. Movement of the first finned heat sink 3 and second finned heat sink 5 away from each other causes the locking tabs 13, 15 to move into an interlocking position. This maintains the first finned heat sink 3 interlocked with the second finned heat sink 5 so that the components of the cooling module 1, 1' remain assembled when the cooling module is in a maintenance configuration. The cooling module 1 can then be removed from the thermal transfer members; i.e. the heat pipes 20, shown in FIG. 1*a* and the metal rods shown in FIG. 1*b*, if required.

Figure 6:
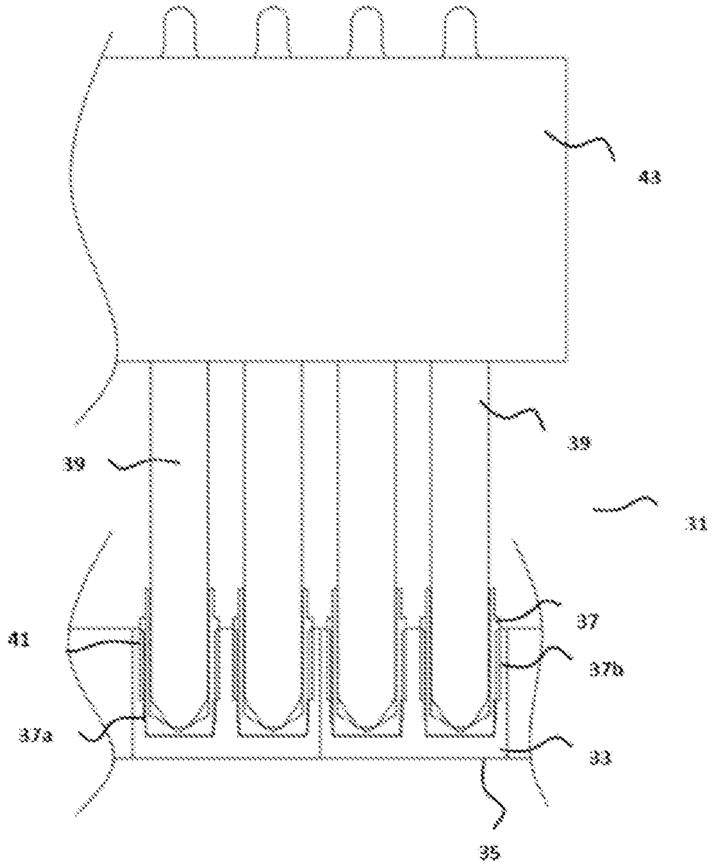
FIG. 6 is a cross-sectional view through a cooling system for an LED print curing apparatus.
Figure 8:
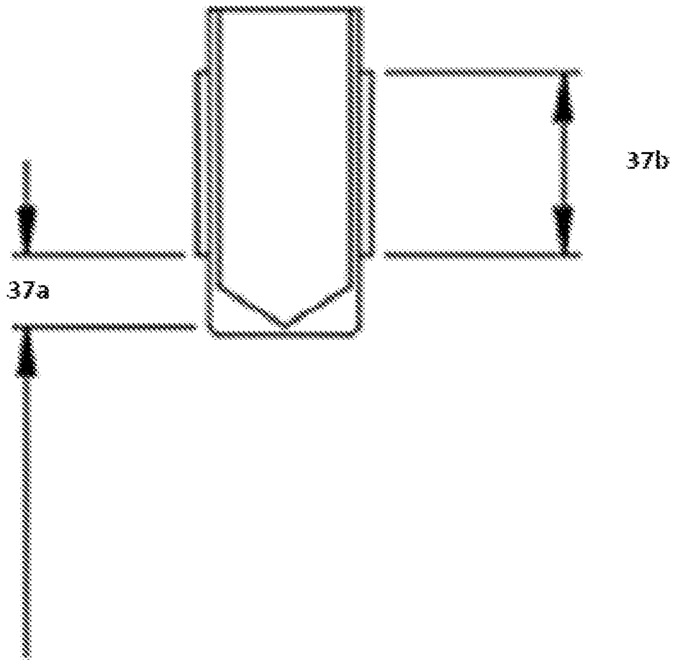
FIG. 8 is a cross-sectional view of the heat pipe and collar shown in FIG. 7*a*.

Referring to FIGS. 6 and 8, a cooling system 31 for an LED print curing apparatus is shown. The cooling system 31 comprises an LED mount 33. In use a plurality of LEDs 35 are mounted on the LED mount 33. In use, the LEDs are arranged to emit radiation from an outer, substrate-facing side. The cooling system 31 supports a plurality of thermal transfer members, such as copper rods or copper heat pipes 39, wherein the heat pipes 39 sit within the body of the LED mount 33 and transfer heat away from the LEDs 35 to a cooling module 43. It is understood that in further embodiments, an alternative thermal transfer member rather than the heat pipe shown in FIGS. 6 and 8 is used; for example, a metal rod.

The cooling system 31 comprises an aluminium LED mount 33, which carries heat generated by the LEDs 35 away from the LEDs 35 to the thermal transfer members/copper heat pipes 39. The dimensions of the aluminium heat sink 33 are carefully configured to be fitted within the lamphead of a curing apparatus (not shown). The cooling system 31 comprising the LED mount 33, LEDs 35 and thermal transfer members/heat pipes 39 form a modular system. In use, multiple cooling systems 31 are arranged along the length of a curing apparatus. The plurality of thermal transfer members/heat pipes 39 are a passive heat transfer system to efficiently carry heat away from the LEDs 35. In one embodiment of the present invention, the modular system comprises two heat pipes 39 per length of LED mount 33.

Figure 7A:
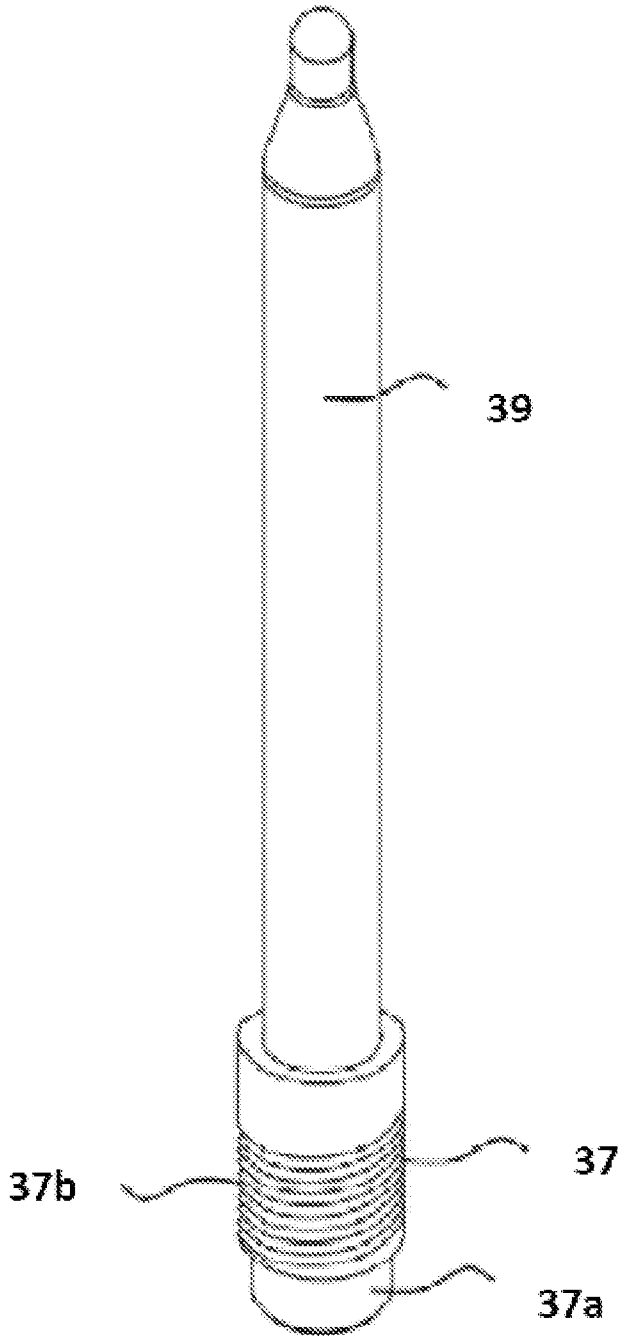
FIG. 7*a* is a perspective view of a heat pipe and collar as shown in FIG. 6.
Figure 7B:
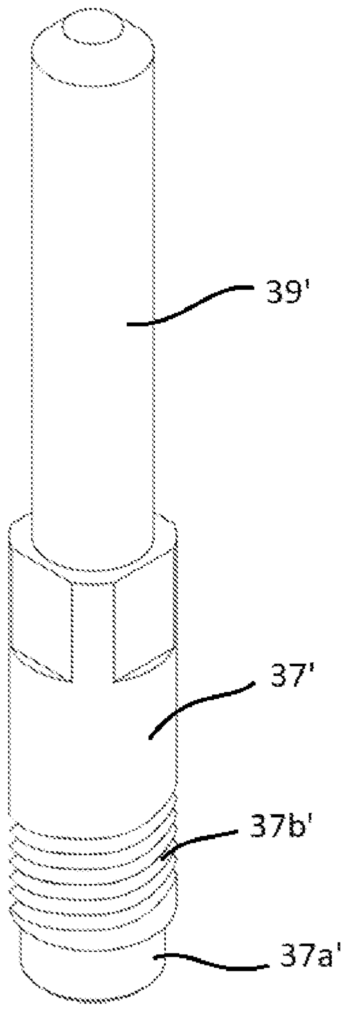
FIG. 7*b* is a perspective view of an alternative embodiment of the thermal transfer member of FIG. 7*a*, wherein the thermal transfer member is a metal rod with a collar.

With reference to FIG. 6 and FIGS. 7*a* and 7*b*, each of the thermal transfer members/copper heat pipes 39', 39 are provided with a copper collar 37, 37' which is soldered to the heat pipe 39, 39'. The collar 37, 37' includes a screw thread 37*b*, 37*b'* on a substantial portion of an outer surface thereof and a smooth, non-threaded portion 37*a*, 37*a'*. The LED mount 33 comprises a series of substantially cylindrical bores 41, which have a threaded inner surface for engagement with the corresponding screw thread 37*b*, 37*b'* on the outer surface of a copper collar 37, 37'. This allows the thermal transfer members/heat pipes 39', 39 to be screwed into the bores 41 in the LED mount 33 for secure attachment thereto with the collar 37, 37'. The collar shown in FIG. 11*a* is surrounding the evaporator section of the heat pipe 39 so that when attached each heat pipe 39 is fully contained within the LED mount 33 when fitted to the cooling system 31. The collar shown in FIG. 11*b* is surrounding a first end of the metal rod/thermal transfer member 39' so that when attached each metal rod/thermal transfer member 39' is fully contained within the LED mount 33 when fitted to the cooling system 31. In use, this allows the LEDs 35 to be mounted to the LED mount 33 before the thermal transfer members/metal rods/heat pipes 39', 39 are each fitted into a respective bore 41.

Referring to FIG. 7*b*, the collar 57' and metal rod 59' are formed as a single piece. This improves thermal transfer and reduces the time and complexity of installation.

The configuration shown in FIGS. 6, 7*a*, 7*b* and 8 significantly improves the ease of installation of the thermal transfer members/heat pipes 39', 39 within a curing apparatus. In use, the LEDs 35 are attached to the LED mount 33 and the thermal transfer members/heat pipes 39', 39 are attached at a later stage. This minimises the installation time in a clean room because only the LEDs need to be installed in this controlled environment, whilst other components of the cooling system can be installed at the location of use of the apparatus. Multiple LED mounts 33 having LEDs 35 attached thereto are installed in the chassis of a curing apparatus before the thermal transfer members/heat pipes 39', 39 are screwed into the LED mount 33 and attached thereto by the mating engagement of the screw thread 37*b*, 37*b'* on the outer surface of the collar 37, 37' with the threaded inner surface of the bore 41 into which the heat pipe 39 or metal rod 39' is received. The present invention allows for ease of assembly of the LED mounts 33 into the curing apparatus before the thermal transfer members/heat pipes 39', 39 and further cooling components are installed. Furthermore, the thermal transfer members/heat pipes 39', 39 and other cooling components can be removed and replaced; for example, if these components fail or require cleaning, without the sealed chassis of the apparatus containing the LEDS being removed. Removal of the LEDS is more likely to damage the delicate LEDs and the configuration described with regard to FIGS. 6, 7*a*, 7*b* and 8 significantly reduces the risk of damage or contamination of the LEDs.

A ceramic paste (not shown) is provided between the outer surface of each of the heat pipe collars 37, 37' and the respective inner surface of the bore 41 in which the thermal transfer members/heat pipe 39', 39 is held. The ceramic paste prevents voids forming between the collar 37', 37 and the bore 41, which ensures optimum thermal contact between the LED mount 33 and the thermal transfer members/heat pipes 39', 39 because there are no thermal barriers to the heat transfer away from the LED mount 33 and so away from the LEDs 35, in use.

In the example shown in which corresponding screw threads 37*b*, 37*b'* are provided on the external surface of the collar 37, 37' and the internal surface of the bore 41, it will be appreciated that the ceramic paste can be applied to one or both threaded surfaces before the thermal transfer members/metal rods/heat pipes 39', 39 are screwed into the LED mount 33. During installation, the rotation of the external threaded surface of the collar 37', 37 against the internal threaded surface of the bore 41 spreads the ceramic paste so that any voids are eliminated.

Referring to FIGS. 6 and 7*a*, in use, the central core of each heat pipe 39 contains a liquid, such as water or ammonia, which prior to heating is held by a wick structure (not shown). The heat pipe 39 contains a vacuum so that the liquid will boil and take up heat generated by the LEDs 35 at a temperature below the boiling point of the liquid at atmospheric pressure. The water will boil and effectively transfer latent heat from the LEDs 35 modules at this lower temperature. In use, when the LED print curing apparatus is switched on and the LEDs 35 are radiating to cure a substrate, heat generated by the LEDs 35 is transferred away from the rear, inner face of the LEDs 35 to the LED mount 33. Heat is carried away from the LED mount 33 by the heat pipe/s 39 to a cooling module 43. On heating, the liquid held within the core of the heat pipe 39 is vaporised and the heat is carried away before the liquid re-condenses and the wick transports the liquid back to the base of the heat pipe 39. The heat pipe/s 39 ensures that heat is carried away quickly and efficiently from the LEDs 35 and condensation of the liquid contained within the core of the heat pipe 39 is enhanced by capillary action.

As shown in FIG. 6, the evaporator section of each heat pipe 39 is adjacent to the LED mount 33 and the LEDs 35 that are mounted thereon. The opposing end—i.e., the condenser end of each heat pipe 39 is held within a cooling module 43. In a preferred embodiment, the cooling module 33 is an air-cooled finned heat sink.

As shown with particular reference to FIG. 7*a*, 7*b* and FIG. 8, in order to increase the contact surface area of the collars 37, 37' and the bores 41, the outer walls of the collars 37, 37' are shaped to fit against correspondingly shaped walls of the bores 41. Each collar 37, 37' has a smooth, rounded base section 37*a*, 37*a'*, which is received into a bore 41. The mechanical fit of the threaded portion 37*b*, 37*b'* with the threaded portion of the bore 41 in addition to the heat transfer material (not shown) between the external surface of the collar 37, 37' and the thermal transfer members/metal rod/heat pipe 39', 39 and the internal surface of the bore 39 ensures that there are no voids such that thermal transfer is optimised.

Figure 9:
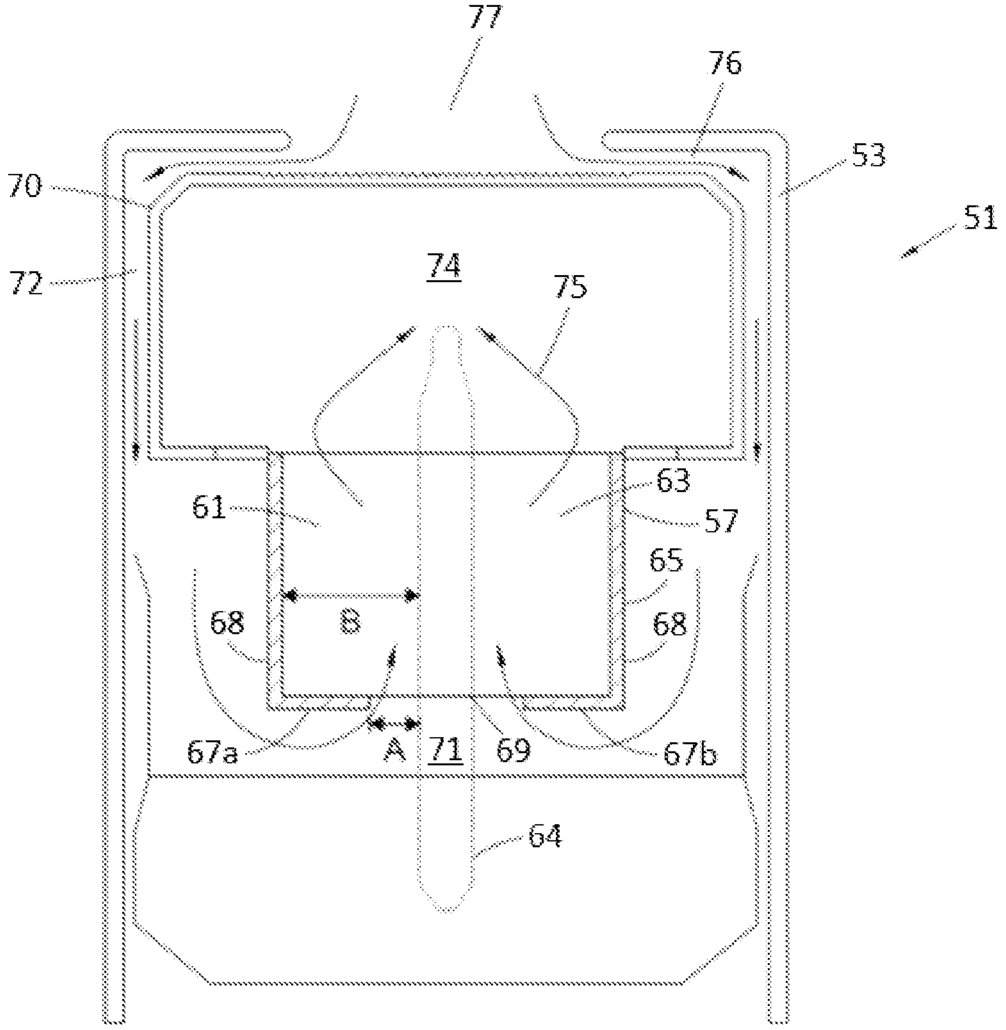
FIG. 9 shows a cross section through an LED curing apparatus and the air flow path therethrough for a preferred embodiment wherein air is pulled through the LED curing apparatus.
Figure 10:
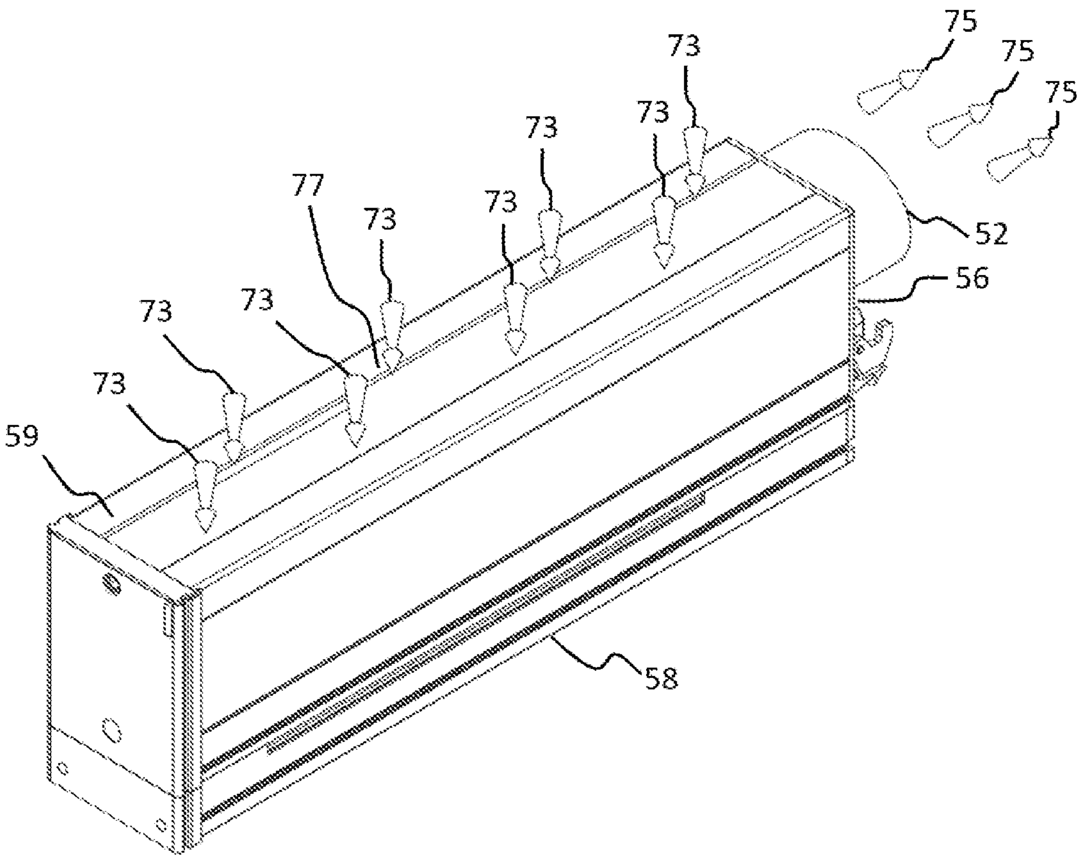
FIG. 10 shows a perspective external view of the LED curing apparatus of the FIG. 9 showing the direction of air flow through the apparatus.

Referring to FIGS. 9 and 10, an LED curing apparatus 51 is shown comprising a housing 53. The housing 53 comprises an outer casing wherein LEDs (not shown) are mounted at the base 58 of the housing 53 and an air inlet 77 is positioned in an upper face 59 of the housing 53. The air inlet 77 is an elongate opening along substantially the entire length of the upper face of the apparatus 51. The base 58 of the LED curing apparatus 51 is the substrate-facing surface with the or each LED radiation source arranged thereon. In a preferred embodiment, the LED radiation source is a UV radiation source. In alternative embodiments, the LED radiation source is an infra-red radiation source. The upper face of the apparatus 51 is substantially parallel to and spaced apart from the base of the apparatus 51. An air outlet 52 is positioned at a first end 56 of the apparatus 51, wherein the first end 56 is perpendicular to and between the base 58 and the upper face 59 of the apparatus 51. The air outlet 52 is attached to ducting connected to a source of ambient or cooled air.

The LED curing apparatus 51 comprises a plurality of LEDs (not shown) mounted to an LED mount. The inner walls of the housing 53 and the cavities formed therein are shaped to control air pressure and air flow through the LED curing apparatus 51. The housing 53 is substantially cuboidal comprising outer walls 53 and inner walls 70 to which further components are mounted. The shape of the inner walls of the housing 53 controls air pressure and so air flow through the device.

Referring to FIG. 9, an inner wall of the housing 70 defines an upper air channel 72 through which air from the air inlet 77 passes into the curing apparatus 51. The upper air channel 72 is parallel to the outer walls 53 of the housing. Preferably, the width of the upper air channel 72 is about 4 mm. The upper air channel 72 increases in width to about 10 mm and passes from the air inlet 77 to an inlet cavity or void 71.

A plurality of thermal transfer members, shown in FIGS. 9 and 10 to be heat pipes 14, are mounted along the length of the LED curing apparatus 1. In alternative embodiments, an alternative thermal transfer member is used; for example, as shown in FIG. 1*b*, the thermal transfer member is a metal rod. In the embodiment shown in FIG. 9, each heat pipe 64 is held securely within a cooling module 57, ensuring optimum thermal contact between the heat pipe 64 and a substantially cylindrical recess into which each heat pipe is received. The or each thermal transfer member/heat pipe 64 passes through the inlet cavity or void 71 of the housing 53. The cooling module 57 comprises a first finned heat sink 61 and a second finned heat sink 63. The first finned heat sink 61 is substantially symmetrical to the second finned heat sink 63 about a central axis or midline. Each finned heat sink 61, 63 is shaped to maximise heat transfer away from the heat sink 61, 63 through a plurality of fins (not shown), which are substantially cuboidal. In alternative embodiments, it is understood that equivalent heat sinks could be used. For example, an arrangement of pins or blades could be used, including a skived heat sink. It is also envisaged that alternative configurations of the present invention include finned heat sinks in alternative positions to carry heat away from the thermal transfer members, which are either heat pipes or metal rods.

The inner walls of the housing 53 define a main cavity or void 71 below the or each finned heat sink 61, 63 and a second cavity or outlet void 74 above the or each finned heat sink 61, 63 through which heated air 75 exits the LED curing apparatus 51. For example, the cross-sectional area of the air path through the outlet void 74 is about 1.2 times greater than the cross-sectional area of the air path through the inlet void 71.

The first finned heat sink 61 and the second finned heat sink 63 are removably held within the housing 53 by a shaped extrusion 65 comprising a base 67*a*, 67*b* and two upstanding walls 68. The base 67*a*, 67*b* and upstanding walls 68 are formed of a shaped extrusion, wherein each upstanding wall 68 is substantially perpendicular to the base 67*a*, 67*b* and held within the outer walls of the housing 53. The base 67 comprises a first base member 67*a* and a second base member 67*b*, which are substantially parallel to the LED mount. The first and second base members 67*a*, 67*b* partially cover the base of the respective finned heat sink 61, 63. The first finned heat sink 61 is housed above the first base member 67*a* and the second finned heat sink 63 is housed above the second base member 67*b*. The base members 67*a*, 67*b* are spaced apart from each other to form a restriction in the air flow through a gap therebetween to provide an air inlet 69 into the finned heat sinks 61, 63 through which air is pulled.

Referring to FIGS. 9 and 10, air 77 is pulled into the apparatus by a source of air connected by ducting to the outlet 52. Typically, the air pressure at the outlet ducting is about −2050 Pa relative to ambient pressure and the pressure of air drawn into the air inlet 77 is between about −350 Pa to −500 Pa relative to ambient pressure. The air pressure is higher at the inlet 77 to the apparatus to create suction so that air is pulled through the apparatus 1 from the inlet 77 to the outlet 52. The air 76 flows from the inlet 77 around an air passage 72 along the inner walls of the housing 53 and enters the open, inlet cavity/void 71 below the or each finned heat sink 61, 63 to expand such that air pressure decreases to about −500 Pa to −450 Pa relative to ambient pressure. The air from the open cavity/void 71 adjacent to the LED mount then flows, i.e., is pulled into the finned heat sinks 61, 63 to carry heat away from the heat sinks 61, 63.

The air inlet 69 into the finned heat sinks 61, 63 controls i.e., throttles the air flow entering the finned heat sinks 61, 63 from the inlet cavity 71 of the housing 53 to create a turbulent flow of air through the finned heat sinks 61, 63. When the heated air 75 is carried out of the finned heat sinks 61, 63 it expands into the second cavity or outlet void 74 so that pressure decreases again.

The restriction 67*a*, 67*b* proximal to the or each finned heat sink 61, 63 reduces the cross sectional area of the air flow path from the open inlet cavity 71 below the finned heat sink 61, 63. The reduction in the cross sectional area of the air flow path from the inlet cavity 71 to the finned heat sinks 61, 63 is by a ratio of about 1:2.3 (inlet cavity:finned heat sink). The reduction in the cross-sectional area of the air flow path from the cavity 71 below the heat sinks 61, 63 to the or each finned heat sink 61, 63 reduces by more than 50%. In an example apparatus 51, the air inlet 69 between the outer wall of the thermal transfer member/heat pipe 64 and the restriction 67*a*, 67*b* is about 8.5 mm (A) so that the open area per heat sink is about 410 $mm^2$. Air enters the finned heat sinks 61, 63 through the air inlet 69 and passes across the fins of the heat sinks 61, 63, wherein the distance (B) along, i.e., the length of each fin from the outer wall of the thermal transfer member/heat pipe 64, is about 19.5 mm. When air flows into the heat sinks 61, 63, the restriction of the air flow by the first and second base members 67*a*, 67*b* causes significant turbulence of the air passing into the finned heatsinks 61, 63, which increases heat transfer from the fins to the surrounding air. This increases the cooling achieved by the finned heat sinks 61, 63.

The size and shape of the housing 53, the air inlet 77, the air passage 72, the cavity 71, the base supports 67*a*, 67*b* and the second cavity/outlet void 74 are carefully configured to decrease relative air pressure moving through the apparatus 1 and maximise cooling of the finned heat sinks 61, 63. The configuration of the present invention ensures that air flows through the apparatus 51 to carry heat away from the thermal transfer members 64, for example heat pipes 64 or metal rods (not shown) and ensures that cooling is substantially uniform along the length of the device 51. The air in the inlet cavity 71 below the finned heat sinks 61, 63 is at a higher pressure than the air in the outlet cavity 74 above the finned heat sinks 61, 63. The air pressure decreases when the air moves out of the finned heat sinks 61, 63 to the outlet cavity 74.

The air pressure outside the apparatus 51 at the air inlet 77 through which air is pulled into the apparatus 51 is about +101 kPa. The air pressure decreases when the air reaches the open sections/cavities 71, 74 into which it expands. The air pressure in the inlet cavity 71 is about −600 Pa relative to ambient pressure and the air pressure of the heated air 75 exiting the finned heat sinks 61, 63 that is pulled towards the air outlet 52 is about −1150 Pa relative to ambient pressure.

The present invention can be configured for any length of apparatus—i.e., according to the required application. The ratios of the air path sections as air flows from the air inlet 77 to the air outlet 52 is controlled to achieve the required air flow and so uniform cooling along the length of the apparatus 51.

Examples of the cross-sectional areas of the air flow passage though each section of the apparatus 51 are set out in Table 1 below for an apparatus having a 30 cm length:

TABLE 1

| Position | 30 cm length apparatus cross sectional area of the air flow passage ($mm^2$) |
|---|---|
| Air inlet (27) | 1964 |
| Air inlet into the | 3280 |

TABLE 1-continued

| Position | 30 cm length apparatus cross sectional area of the air flow passage ($mm^2$) |
|---|---|
| finned heat sinks (19) | |
| Outlet cavity (24) | 3910 |
| Outlet ducting | 6718 |

Referring to FIG. 10, in a preferred embodiment of the present invention, air 73 is pulled into the air inlet 77, which is along the length of the housing 53, from a single fan (not shown) at the air outlet 552 at a first end 6 at the rear of the housing 553. The fan can be connected to the housing 53 by ducting and the fan is positioned remotely from the apparatus 51. Referring to FIG. 9, air 76 is pulled through the housing 53 and enters the cooling module 57 through the air inlet 69 between the first base member 67*a* and the second base member 67*b*. The air inlet 69 effectively controls the air flow entering the cooling module 57. The air inlet/gap 69 through which air enters the finned heat sinks 61, 63 chokes—i.e., restricts and controls the air flow into the finned heat sinks 61, 63. The air then passes along the plurality of fins and through the first and second finned heat sinks 61, 63 adjacent to the thermal transfer members 64, for example, heat pipes 64 or metal rods. The heated air 75 is pulled out of the housing 53 to the outlet cavity 74 and to the outlet 52 to exit and so cool the LED curing apparatus 51.

With reference to FIG. 9, the uniformity of pressure, air flow and so cooling along the length of the apparatus 51 was measured by positioning sensors at fixed points (Position 1—air inlet channel 72; Position 2—air channel into open cavity 71; Position 3—outlet cavity 74). It can be seen from the results shown in Table 2 below that the pressure measurements are substantially uniform along the length of the apparatus:

TABLE 2

| Gauge Pressure (Pa) - relative to ambient pressure | | | | |
|---|---|---|---|---|
| Measurement | Position along the length of the apparatus (mm) | | | |
| Point | 116.25 | 192.75 | 269.25 | 345.75 |
| 1 | −357 | −377 | −473 | −440 |
| 2 | −650 | −783 | −757 | −823 |
| 3 | −483 | −470 | −473 | −447 |

Figure 11:
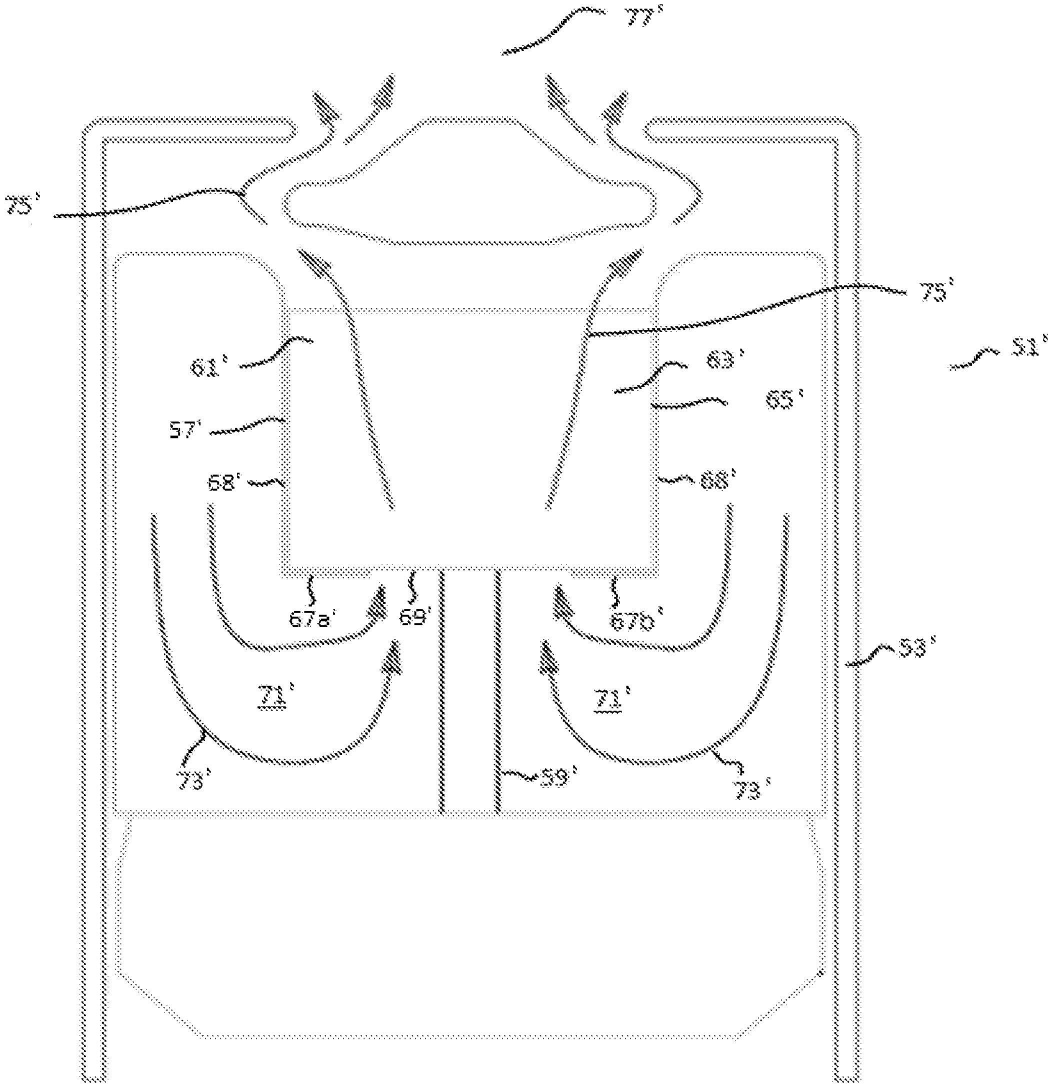
FIG. 11 shows a cross section through an LED curing apparatus and the air flow path therethrough for an embodiment wherein air is blown through the LED curing apparatus.
Figure 12:
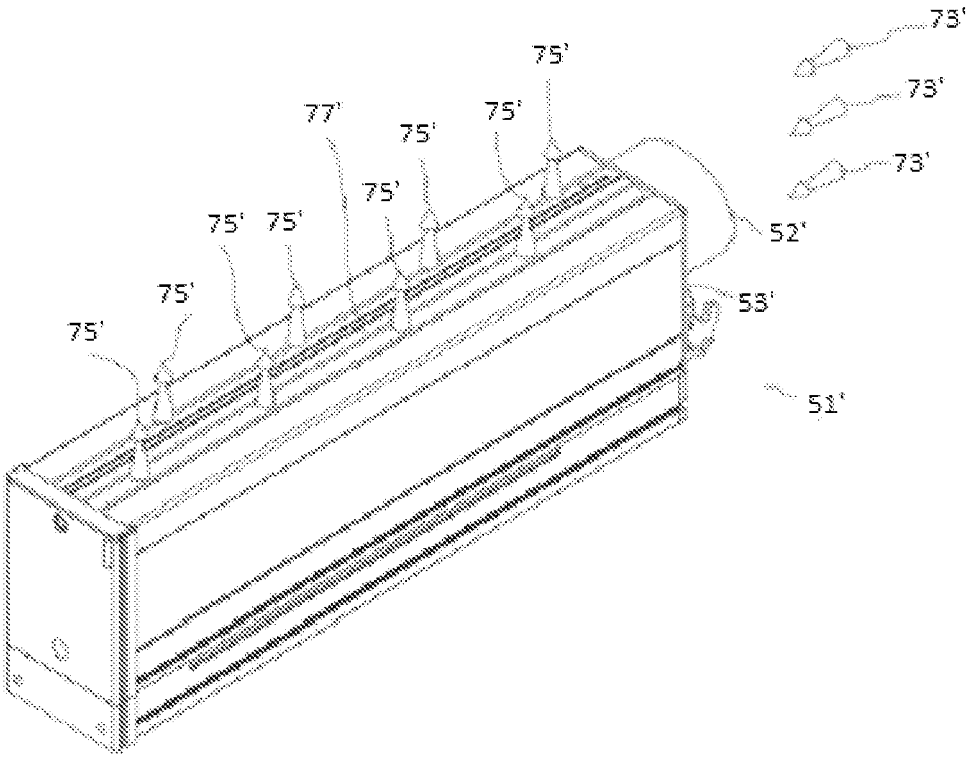
FIG. 12 shows a perspective external view of the LED curing apparatus of FIG. 11 showing the direction of air flow through the apparatus.

Referring to FIGS. 11 and 12, an LED curing apparatus 51' of an alternative embodiment is shown, cool air 73' is blown into and along the length of the housing 53' from a single fan (not shown) into the air inlet 52" at a first end (rear) of the housing 53'. The fan can be connected to the housing by ducting and the fan is positioned remotely from the apparatus 51'. The cool air 73' enters the cooling module 57' through the air inlet 69' between the first support 67*a'* and the second support 67*b'*. The air inlet 69' effectively controls the air flow entering the cooling module 57'. The air inlet/gap 69' through which air enters the finned heat sinks 61', 63' chokes—i.e., restricts and controls the air flow into the finned heat sinks 61', 63'. The air then passes along the plurality of fins and through the first and second finned heat sinks 61', 63' adjacent to the condenser section of the heat pipe. The heated air 75' rises upwards through the cooling module 57' to the outlet 77' to leave the housing 53'.

The above described embodiments have been given by way of example only, and the skilled reader will naturally appreciate that many variations could be made thereto without departing from the scope of the claims.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein and vice versa.

Within this specification, the term "about" means plus or minus 20%, more preferably, plus or minus 10%, even more preferably, plus or minus 5%, most preferably, plus or minus 2%.

Within this specification, the term "substantially" means a deviation of plus or minus 20%; more preferably, plus or minus 10%; even more preferably, plus or minus 5%, most preferably, plus or minus 2%. Within this specification, reference to "substantially" includes reference to "completely" and/or "exactly." That is, where the word substantially is included, it will be appreciated that this also includes reference to the particular sentence without the word substantially.

The invention claimed is:

1. A cooling module, which is securable to one or more thermal transfer members for an LED curing apparatus, wherein the cooling module comprises:

a first finned heat sink and a second finned heat sink;

wherein the first finned heat sink is removably securable to the second finned heat sink to provide a row of substantially cylindrical apertures therebetween which extend through the cooling module, wherein each of a plurality of fins protrude from the first finned heat sink and from the second finned heat sink and each fin is substantially perpendicular to the length of the or each aperture wherein the first finned heat sink is removably secured proximal to the second finned heat sink by at least one locking member, and wherein the or each locking member is inserted such that its length is parallel to the length of the or each aperture.

2. The cooling module according to claim 1, wherein the cooling module is securable to one or more thermal transfer members.

3. The cooling module according to claim 1, wherein the row of substantially cylindrical apertures are present along the midline of the cooling module, and wherein an inner surface of the first finned heat sink is proximal to an inner surface of the second finned heat sink substantially along the midline of the cooling module.

4. The cooling module according to claim 1, comprising one or more thermal transfer members wherein the first finned heat sink and the second finned heat sink are secured to the or each thermal transfer member.

5. The cooling module according to claim 1, wherein the cooling module is substantially symmetrical about a rotational axis of symmetry positioned along its midline.

6. The cooling module according to claim 1, wherein the first and second finned heat sink each comprise an array of fins wherein each fin is equidistant from an adjacent fin.

7. The cooling module according to claim 1, wherein the or each locking member brings the first finned heat sink into locking engagement with the second finned heat sink and wherein the first finned heat sink is removably secured proximal to the second finned heat sink by at least two locking members.

8. The cooling module according to claim 1, wherein the or each locking member is spaced apart from the or each fin of the first finned heat sink and the or each fin of the second finned heat sink.

9. The cooling module according to claim 1, wherein the first finned heat sink comprises at least one locking tab for interlocking with at least one locking tab on the second finned heat sink.

10. The cooling module according to claim 1, wherein the first finned heat sink comprises at least one locking tab for interlocking with at least one locking tab on the second finned heat sink and the or each locking tab is L-shaped or U shaped.

11. The cooling module according to claim 1, wherein the first finned heat sink comprises at least one locking tab for interlocking with at least one locking tab on the second finned heat sink and movement of the first finned heat sink away from the second finned heat sink moves the or each locking tab of the second finned heat sink into an interlocking configuration.

12. The cooling module according to claim 1, wherein the first finned heat sink comprises at least one locking tab for interlocking with at least one locking tab on the second finned heat sink such that when the or each locking tab of the first finned heat sink and the or each locking tab of the second finned heat sink are interlocked, further movement of the first finned heat sink away from the second finned heat sink is restricted.

13. The cooling module according to claim 1, wherein the first finned heat sink comprises at least one locking tab for interlocking with at least one locking tab on the second finned heat sink and wherein the or each locking member comprises a tension pin or a resilient pin or a spring pin or a screw insertable between the at least one locking tab of the first finned heat sink and the at least one locking tab of the second finned heat sink to prevent movement of the first finned heat sink away from the second finned heat sink.

14. The cooling module according to claim 1, wherein the first finned heat sink comprises at least one locking tab for interlocking with at least one locking tab on the second finned heat sink and wherein the or each locking member is insertable between the at least one locking tab of the first finned heat sink and the at least one locking tab of the second finned heat sink to lock the locking tabs together in a locked configuration.

15. The cooling module according to claim 1, wherein the first finned heat sink and the second finned heat sink are aluminium.

16. An LED curing apparatus comprising:

an LED array comprising a plurality of LEDs mounted on an LED heat sink;

at least one cooling module according to claim 1 secured around one or more thermal transfer members, wherein a first end of the or each thermal transfer member is proximal to the LED array and a second end of the or each thermal transfer member is held substantially within the at least one cooling module.

17. A method of installation of at least one cooling module according to claim 1 into an LED curing apparatus, wherein the LED curing apparatus comprises a plurality of thermal transfer members, comprising:

removably securing a first finned heat sink to a second finned heat sink to provide at least one aperture therebetween, wherein a thermal transfer member is held within each of the at least one apertures;

adjusting the position of the or each thermal transfer member;

locking the first finned heat sink to the second finned heat sink by insertion of at least one locking member to form a cooling module; attaching the cooling module to an LED heat sink supporting an LED array.

18. The cooling module according to claim 1, wherein the first and second heat sinks are removably secured and linked.

* * * * *